Figure 5:
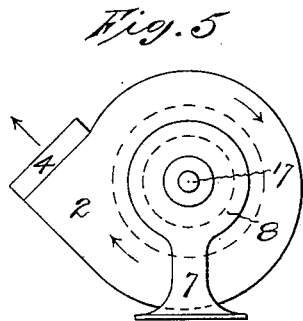

No. 656,023. Patented Aug. 14, 1900.
C. H. KEENEY.
EXHAUSTER AND BLOWER.
(Application filed July 31, 1899.)
(No Model.) 3 Sheets—Sheet 1.
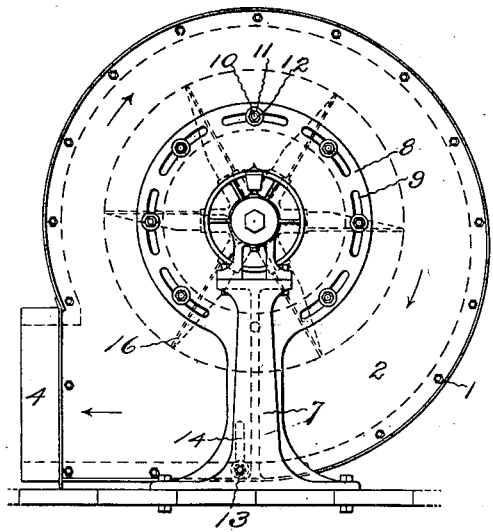
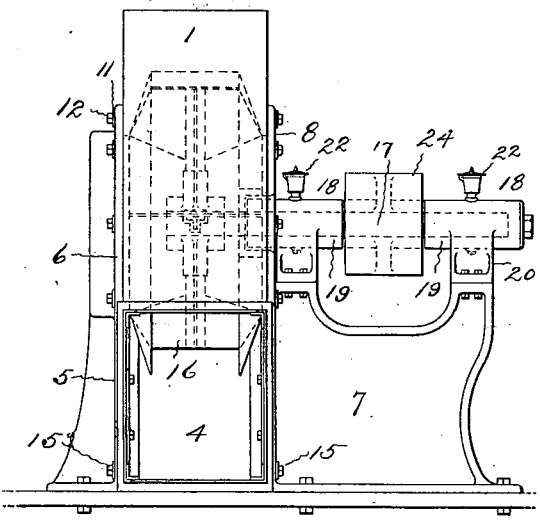
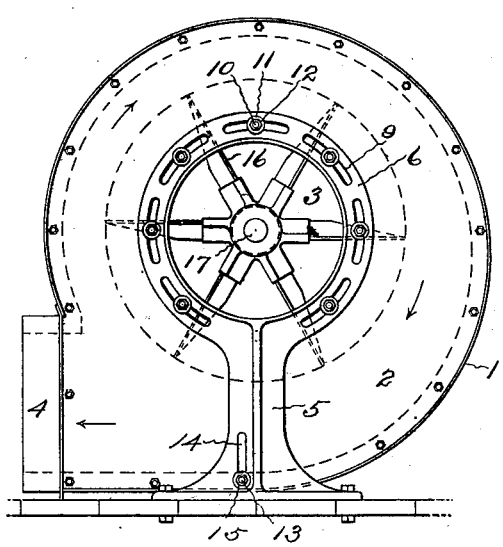
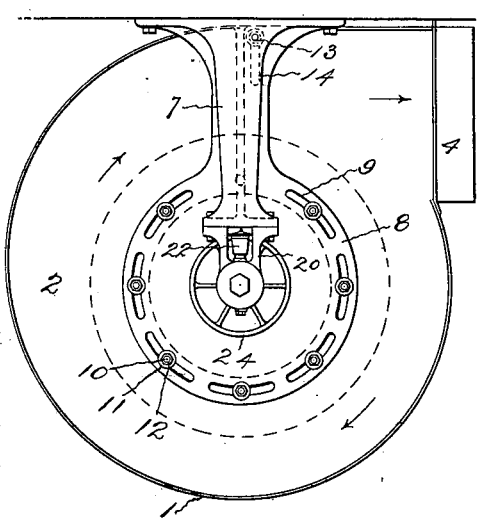
Witnesses:
F. G. Holcomb.
C. E. Bickard.
Inventor:
Charles H. Keeney,
by Harry R. Williams,
atty.

No. 656,023. Patented Aug. 14, 1900.
C. H. KEENEY.
EXHAUSTER AND BLOWER.
(Application filed July 31, 1899.)
(No Model.) 3 Sheets—Sheet 2.

No. 656,023. Patented Aug. 14, 1900.
C. H. KEENEY.
EXHAUSTER AND BLOWER.
(Application filed July 31, 1899.)
(No Model.) 3 Sheets—Sheet 3.
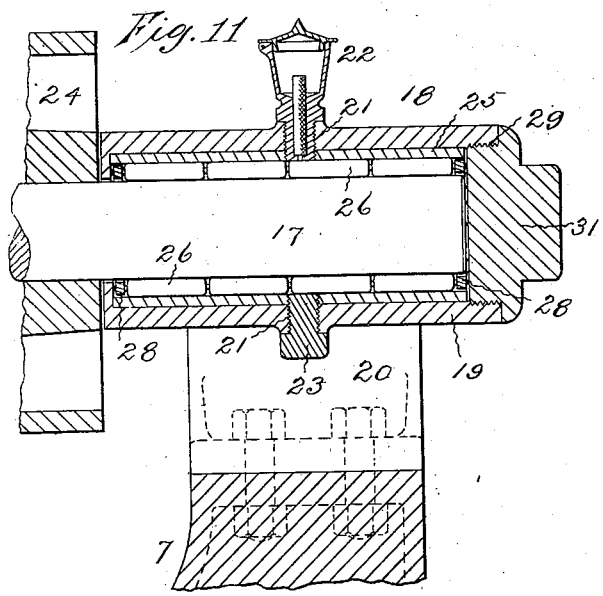
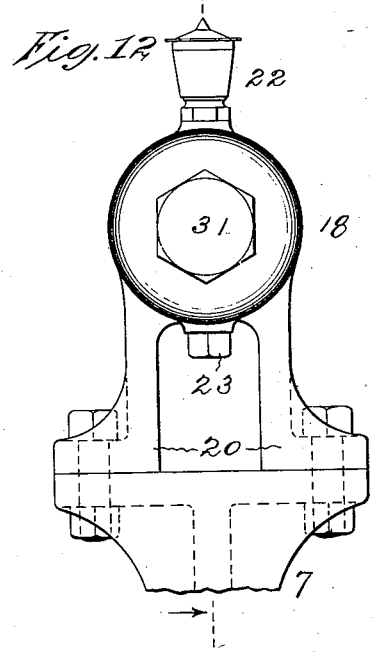
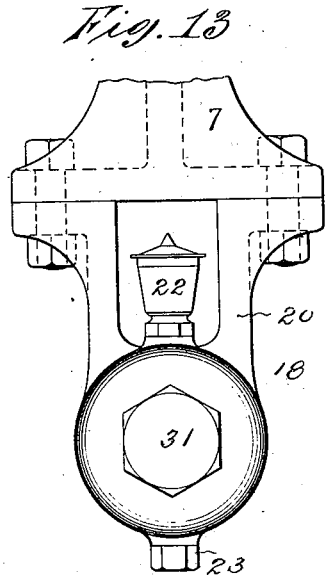
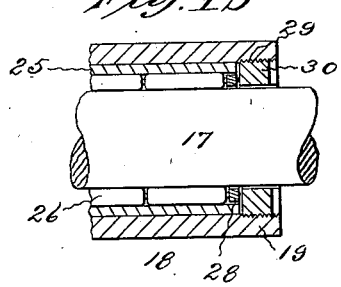
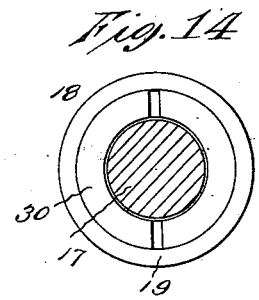
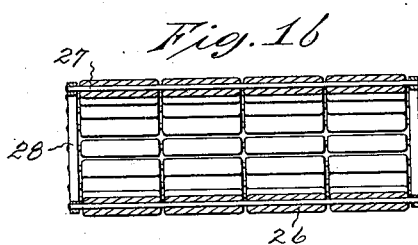
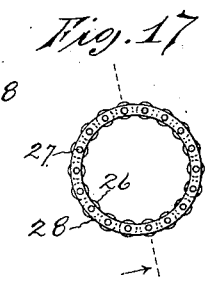
Witnesses:
T. J. Holcomb.
C. E. Buckland.
Inventor
Charles H. Keeney, by
Harry R. Williams, atty.
THE NORRIS PETERS CO., PHOTO-LITHO., WASHINGTON, D. C.

UNITED STATES PATENT OFFICE.

CHARLES H. KEENEY, OF HARTFORD, CONNECTICUT.

EXHAUSTER AND BLOWER.

SPECIFICATION forming part of Letters Patent No. 656,023, dated August 14, 1900.

Application filed July 31, 1899. Serial No. 725,578. (No model.)

*To all whom it may concern:*

Be it known that I, CHARLES H. KEENEY, a citizen of the United States, residing at Hartford, in the county of Hartford and State of Connecticut, have invented certain new and useful Improvements in Exhausters and Blowers, of which the following is a specification.

This invention relates to those machines that are built for producing air-currents which are utilized for various purposes, more particularly for removing chips, shavings, and sawdust from woodworking-machines, and for conveying to a distance such materials as tanbark, wood-pulp, emery, and other dust, smoke, hot gases, and acid fumes, also for ventilating and heating purposes.

The object of this invention is the production of a machine of this nature which is so constructed that it may be originally set up on a floor or suspended from a ceiling, either as a right or left hand machine, or after use may be altered into a right or left hand upright or suspended machine, and whether right or left handed may be adjusted so that its discharge will project horizontally in either direction or vertically up or down or at any desired intermediate angle on either side, thereby providing a single form of machine that is adapted to be located and arranged according to the exigencies of its environment, thus obviating the necessity of having a number of different patterns of machines for meeting the various conditions of use.

The exhauster shown in the accompanying drawings as illustrating the invention has a fan or blast-wheel mounted upon a journal that is supported by roller-bearings located in boxes secured to standards which are adapted to be bolted to a floor or to overhead timbers. The heads of these standards are circular, and near the outer edge of each head is an annular series of slots. Bolts extend from the side walls of the shell which incloses the fan through the slots, and outside the heads of the standards are provided with clamping-nuts. If these nuts are loosened, the shell is free to be adjusted about the axis of the fan in either direction, and if the bolts are removed the shell can be completely revolved and finally set with the discharge projecting at any desired angle. When the bolts are removed, if the fan-journal is drawn out the shell and fan are free to be taken from the heads and replaced in a reverse position.

Figure 1 of the views shows a side elevation of a right-hand exhauster having a bottom horizontal discharge. Fig. 2 is a view looking toward the outlet. Fig. 3 is an elevation of the same exhauster arranged as a left-hand machine with a bottom horizontal discharge. Fig. 4 is an elevation of the left-hand exhauster supported from above with a top horizontal discharge. Figs. 5, 6, 7, 8, 9, and 10 are diagrams illustrating various angles at which the discharge of this exhauster may be set. Fig. 11 is an enlarged sectional view of one of the bearing-boxes. Fig. 12 is an end elevation of this box as arranged when the exhauster is set upon a floor. Fig. 13 is an end elevation of this same box as arranged when the exhauster is suspended from above. Fig. 14 is an end view of one of the bearings. Fig. 15 is a sectional view of a portion of one of the bearings. Fig. 16 is a sectional view of the bearing-rollers and their holding-rings. Fig. 17 is an end view of one of the rings and the bearing-rollers.

Figure 6:
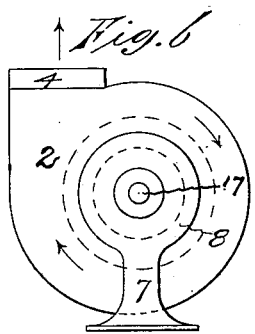
Figure 7:
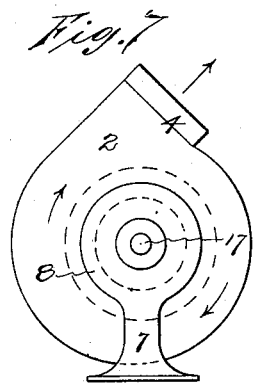
Figure 8:
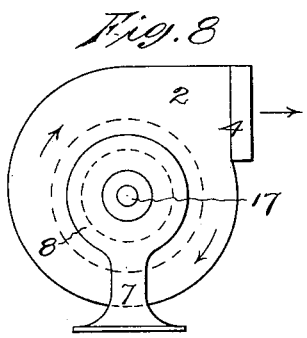
Figure 9:
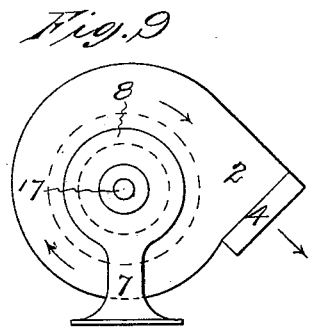
Figure 10:
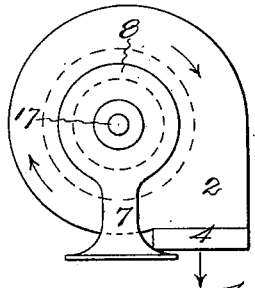

The edge wall 1 and the side walls 2 of the shell of the exhauster shown are formed to a common shape of suitable sheet metal and bolted together in an approved manner. One of the side walls has a central opening 3 for the entrance of air and the material to be blown, and a mouthpiece 4 is applied to the opening in the edge wall to provide a convenient outlet. On the inlet side of the shell is a supporting-standard 5 that has an annular head 6, Fig. 3, and on the other side of the shell is a standard 7, that has a disk-like head 8, Fig. 4. Near their outer edges each of these standard-heads has a circular series of slots 9, and extending from the side walls of the shell through these slots are bolts 10, that outside of the heads are provided with washers 11 and nuts 12. One of the rim-bolts 13 may also be extended from each side wall of the shell through a slot 14 near the base of each standard and provided with a nut 15 for assisting in holding the shell when adjusted. The standards are adapted to be bolted to a floor, as shown in Fig. 3, or to ceiling-timbers, as shown in Fig. 4, and whether the standards are supported upright or suspended downwardly when the nuts are loosened the shell may be adjusted within the limit of the movements of the bolts in the slots, so that the mouthpiece can be made to point in different directions. Should the bolts passing through the slots be removed, the shell may be turned a complete revolution and the mouthpiece pointed either vertically up, as shown in Fig. 6, or vertically down, as shown in Fig. 10, or horizontally to either side, as shown in Fig. 8, or to any angle either up or down on either side, as represented by Figs. 5, 7, and 9. When the outlet is pointed in the right direction, so that the conducting-pipes of the system may be connected in the most convenient manner with the smallest number of bends, the bolts are replaced and the nuts tightened to secure the shell in that position. When the bolts are removed and the fan-shaft is withdrawn from the fan, the shell may be taken from between the standards and replaced in a reverse position—that is, with the inlet on the opposite side—so that the desired connection may be made with the system and the fan driven without employing cross-belts. When the shell is reversed, it may be adjusted as before, so that the outlet will point in the required direction.

The fan 16, that rotates in the shell, is of ordinary size, form, and construction, and the journals of the fan-shaft 17 are supported in bearing-boxes 18 bolted to the standard 7. These bearing-boxes in the form shown have a cylindrical hub 19, from which project legs 20, and perforations 21 are made through the cylindrical hub between the legs and also through points diametrically opposite, Fig. 11. When the exhauster is supported upright upon a floor, as illustrated in Figs. 1 and 2, the stem of an oil-cup 22 is screwed into the top perforation, and a plug 23 is screwed into the lower perforation, as shown in Fig. 12. With the cup in this position oil will readily flow to the bearings. If the exhauster is suspended from above, as illustrated in Fig. 4, the oil-cup stem is screwed into the perforation between the legs of the bearing-box and the plug is screwed into the other perforation, as shown in Fig. 13. This allows the same bearing-box to be used either side up and to have means for properly lubricating the bearings. On the fan-shaft between the bearing-boxes is a pulley 24.

Bushings 25 are inserted inside of the cylindrical hubs of the bearing-boxes of the form shown, and within the bushings are a number of rollers 26. These rollers are loosely placed upon rods 27, that extend between rings 28. The journals fit within these annularly-arranged rollers and rotate freely thereon. The lining-bushing 25 is held against longitudinal movement by the stem of the oil-cup and by the screw-plug. A thread 29 is formed in one end of each cylindrical hub of the bearing-boxes, and turned in the thread of the inner box is a collar 30, Fig. 15, while in the thread of the outer box is turned a cap 31, Fig. 11.

By means of the construction illustrated and described a single form of exhauster is provided, which may be set up either as a right or left hand machine to obviate the necessity of cross-belts, and such machine, whether right or left hand, may be adjusted to have a horizontal, a vertical, or an oblique discharge, either up or down or to either side, so that it may be connected to piping in the most desirable manner with the fewest bends possible either in an upright or suspended position. This construction enables a user to place the exhauster in the most convenient position, and if after use he desires to change the arrangement he may do so without being required to purchase another machine in order to comply with the conditions of the altered arrangement.

Of course the invention described herein is applicable to blowers which have two inlets as well as to exhausters which have but a single inlet, and that usually on the side opposite the pulley or engine.

The invention is, of course, applicable to the double exhauster or blower—that is, a machine which has a blast-wheel at each end of the shaft instead of at one end. The advantage to the manufacturer is that he is not required to keep in stock a number of each different style of machine, for the parts of this machine can be assembled so as to provide the different styles, and this, besides reducing the amount of capital invested, saves a large amount of storage space.

I claim as my invention—

1. An exhaust-fan having two standards with an annular series of slots around the head of each standard, a shell with an inlet-opening through one side and an outlet-opening through the edge, adjustable between the standards, bolts extending horizontally through the slots into the sides of the shell and adjustably securing the standards and the shell, bearings held by the standards, a shaft supported by the bearings and a fan mounted upon the shaft within the shell, substantially as specified.

2. An exhaust-fan having a standard with a disk-like head, a standard with an annular head, a circular series of slots around each standard, a shell with an inlet-opening through one side and an outlet-opening through the edge, adjustable between the standards, bolts extending horizontally through the slots into the sides of the shell and adjustably securing the standards and the shell, bearings held by the standards, a shaft supported by the bearings, and a fan mounted upon the shaft within the shell, substantially as specified.

CHARLES H. KEENEY.

Witnesses:
H. R. WILLIAMS,
C. E. BUCKLAND.